United States Patent [19]
De Leeuw et al.

[11] Patent Number: 6,133,835
[45] Date of Patent: Oct. 17, 2000

[54] IDENTIFICATION TRANSPONDER

[75] Inventors: Dagobert M. De Leeuw; Cornelis M. Hart; Marco Matters, all of Eindhoven, Netherlands

[73] Assignee: U.S. Philips Corporation, New York, N.Y.

[21] Appl. No.: 09/204,179

[22] Filed: Dec. 3, 1998

[30] Foreign Application Priority Data

Dec. 5, 1997 [EP] European Pat. Off. .............. 97203826

[51] Int. Cl.⁷ .................................................. G08B 13/14
[52] U.S. Cl. .................................. 340/572.5; 340/572.3; 340/680
[58] Field of Search .............................. 340/572.5, 572.8, 340/680, 572.3, 572.7, 572.1, 551, 572.2

[56] References Cited

U.S. PATENT DOCUMENTS

| | | | |
|---|---|---|---|
| 4,742,470 | 5/1988 | Juengel | 340/680 |
| 5,119,070 | 6/1992 | Matsumoto et al. | 340/572.5 |
| 5,172,461 | 12/1992 | Pichl | 340/572.5 |
| 5,181,020 | 1/1993 | Furukawa et al. | 340/551 |
| 5,510,770 | 4/1996 | Rhoads | 340/572.3 |
| 5,708,419 | 1/1998 | Isaacson et al. | 340/572.5 |

FOREIGN PATENT DOCUMENTS

0230642A2  8/1987  European Pat. Off. .

OTHER PUBLICATIONS

PHN 16,502, U.S. Ser. No. 09/135,416, filed Aug. 17, 1998.
PHN 16,503, U.S. Ser. No. 09/135,193, filed Aug. 17, 1998.

*Primary Examiner*—Daniel J. Wu
*Assistant Examiner*—John Tweel, Jr.
*Attorney, Agent, or Firm*—Bernard Franzblau

[57] ABSTRACT

An identification transponder comprising an identification code generator (10) embodied as an integrated circuit predominantly comprising organic materials. The integrated circuit may be provided on an anti-theft sticker (5) accommodating an LC resonant circuit (3, 4).

18 Claims, 2 Drawing Sheets

IDENTIFICATION TRANSPONDER

BACKGROUND OF THE INVENTION

The present invention relates to an identification transponder. The inventive identification (ID) transponder labels a product, article or other sort of item provided therewith with a distinct electronically encoded identification code. By means of the ID code the whereabouts of the item so labeled can be tracked and monitored in time so as to improve the logistics associated therewith or pertinent attributes such as the price can be associated with that item. An identification transponder is also referred to as an electronic identification tag or an electronic bar code or the like.

SUMMARY OF THE INVENTION

A first embodiment of the inventive ID transponder comprises an identification code generator and an LC resonant circuit. The presence of the LC circuit allows the transponder to be interrogated contactless and at a distance by means of electromagnetic radiation most suitably within the radio frequency (RF) range. A base station or scanner or the like sends out an RF signal which is picked up in the LC circuit thus generating the supply voltage for the ID code generator. If the ID code generator requires a direct voltage supply one or more diodes are used to rectify the signal output of the LC circuit. The ID code generator periodically damps the LC resonance circuit. The damping characteristic is determined by the specific distinct ID code programmed in the specific ID code generator. The damping characteristic is detected by the base station in a conventional manner and thus enables the ID code to be received by the base station.

The identification (ID) code is encoded as a bit pattern in the identification code generator. Encoding, which involves setting the value of individual bits in the bit pattern, may be done at the time the integrated circuit (IC) is manufactured or at a later stage, in which case the generator is said to be programmable. The ID code generator may be of a conventional design. A suitable embodiment is a programmable ROM including a clock generator, address counters and selection logic capable of addressing each individual ROM cell (one ROM cell being one bit in the pattern) one after the other. In operation, the ID code generator generates a serial bit stream which is repetitive in accordance with the bit pattern.

The ID code generator is embodied as an IC predominantly comprising organic materials. In particular, it comprises polymeric materials. By means of a suitable selection of organic and/or (polymeric) materials, a flexible thin-film ID code generator IC and transponder can be manufactured using a very simple process at a low cost significantly lower than a silicon based device. The low cost allows the transponder to be used as a disposable electronic ID tag. Such disposable ID tags have many useful fields of application, such as tagging products sold in retail and tagging mail to be delivered by postal services. Such a flexible thin-film transponder which is still operative when is it is bent may be suitably provided onto flexible articles or articles which are wrapped or packaged using a flexible packaging material.

In a particular embodiment the ID code generator IC is combined with an anti-theft sticker of a known type which comprises an LC resonance circuit.

A second embodiment of the inventive ID transponder also comprises an identification code generator which receives a direct voltage generated by rectifying an alternating voltage supplied to the ID transponder by a base station by means of a capacitive coupling between the base station and the ID transponder. Upon receiving the direct voltage the identification code generator modulates the direct voltage according to a bit pattern by switching on and off a load transistor across the direct voltage.

BRIEF DESCRIPTION OF THE DRAWINGS

The above and other features and advantages of the invention will be apparent from the following description of exemplary embodiments of the invention with reference to the accompanying drawings, in which.

DESCRIPTION OF THE PREFERRED EMBODIMENTS

Figure 1:
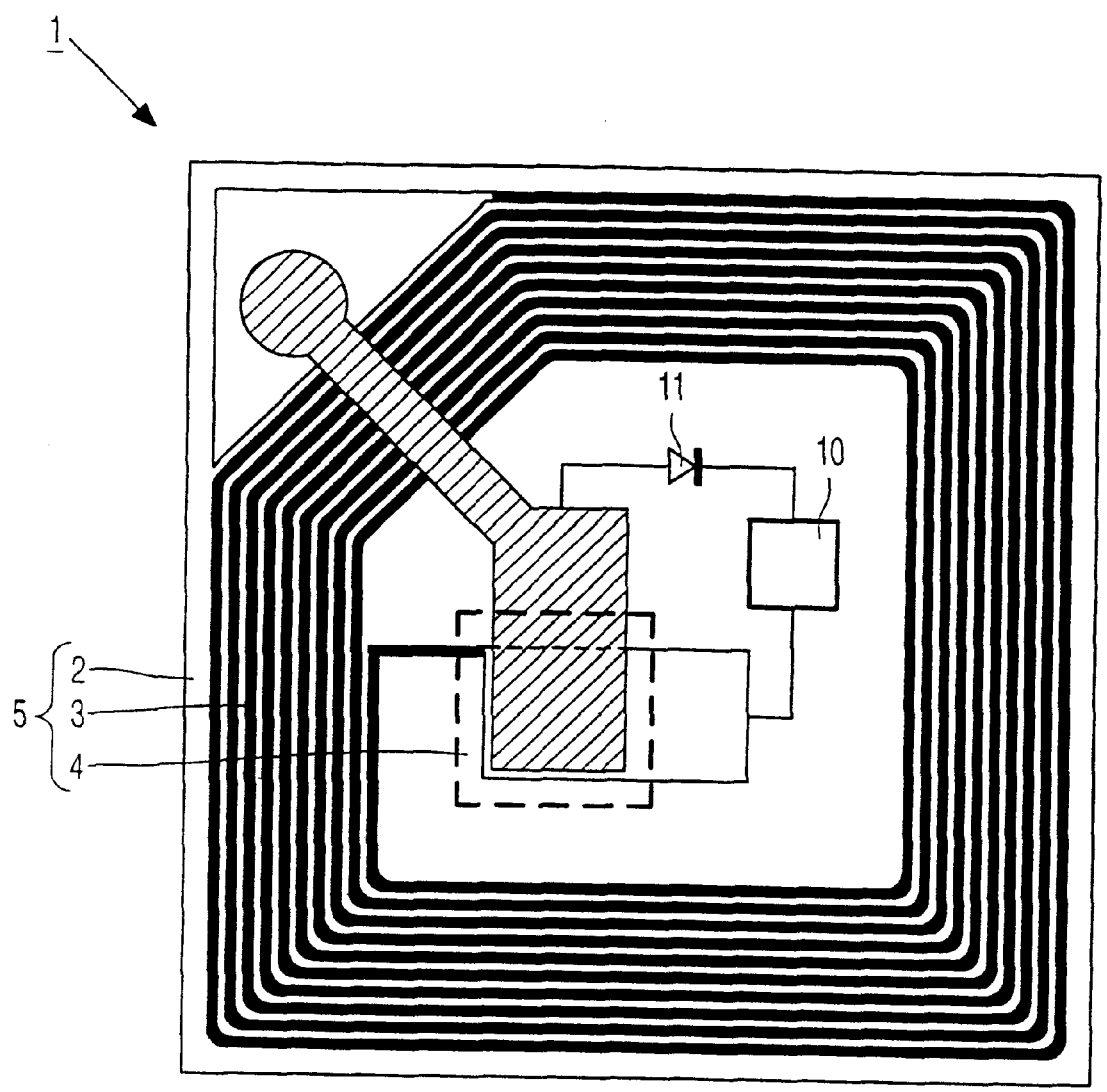
FIG. 1 is a plan view of an embodiment of an RF identification transponder in accordance with the invention.

The FIG. 1 shows a plan view of an embodiment of an RF identification transponder in accordance with the invention indicated by the reference lable 1. The transponder comprises an anti-theft sticker 5 which is of a known type. It consists of a paper or synthetic resinous sheet 2 which is provided with electrically conductive windings forming a coil 3 with inductance L and a capacitor 4 having a capacitance C. The coil 3 and capacitor 4 are connected so as to form an LC resonant circuit. The transponder 1 further comprises a programmable ID code generator 10 embodied as an integrated circuit which is connected via the rectifying diode 11 to the LC circuit (shown diagrammatically).

The ID code generator 10 is a programmable 15-bit ROM including a clock generator, address counters and selection logic capable of addressing each individual ROM cell one after the other at a rate of 30 bits per second.

The ID code generator 10 is embodied as an IC predominantly comprising organic materials. The layout of the IC is such that it has an area of 27 mm$^2$, and includes 326 thin-film top-gate MISFETS which are connected by means of 300 vertical interconnects. The IC may be suitably driven at a direct voltage of 10 V.

The MISFETS and horizontal interconnects are manufactured in accordance with the process outlined in the copending U.S. patent application with application Ser. No. 09/135, 416 (PHN 16.502) filed Aug. 17, 1998. An identical process is outlined in the copending U.S. patent application with application Ser. No. 09/135,193 (PHN 16.503) filed Aug. 17, 1998. Materials and the thickness of the various layers are identical to those used in said patent applications.

The vertical interconnects (which may be made by any suitable conventional process such as photolithography) are manufactured in accordance with the method outlined in the U.S. patent application with application Ser. No. 09/135, 193.

The bit pattern representing the ID code may be programmed during manufacture or at any suitable time afterwards. In the present embodiment, the 15-bit bit pattern is accommodated by 15 vertical interconnects areas of the type described in the U.S. patent application with application Ser. No. 09/135,193 (PHN 16.503) which are or may be programmed using the mechanical method described therein. Programming may be executed manually, or in an automated manner using conventional apparatus such as a probe analyzer or a purpose-built apparatus. The mechanical method is particularly suitable if the ID code generator is to be programmed at the time at which the transponder is attached to the item which is to be electronically identifiable.

When the transponder 1 is positioned nearby an RF base station (not shown) of a conventional type which is set up so as to be able to detect the signal generated by the transponder 1, and an (for example, 8.2 MHz) RF signal is sent out by the base station, the ID code is successfully transmitted to the base station.

Figure 2:
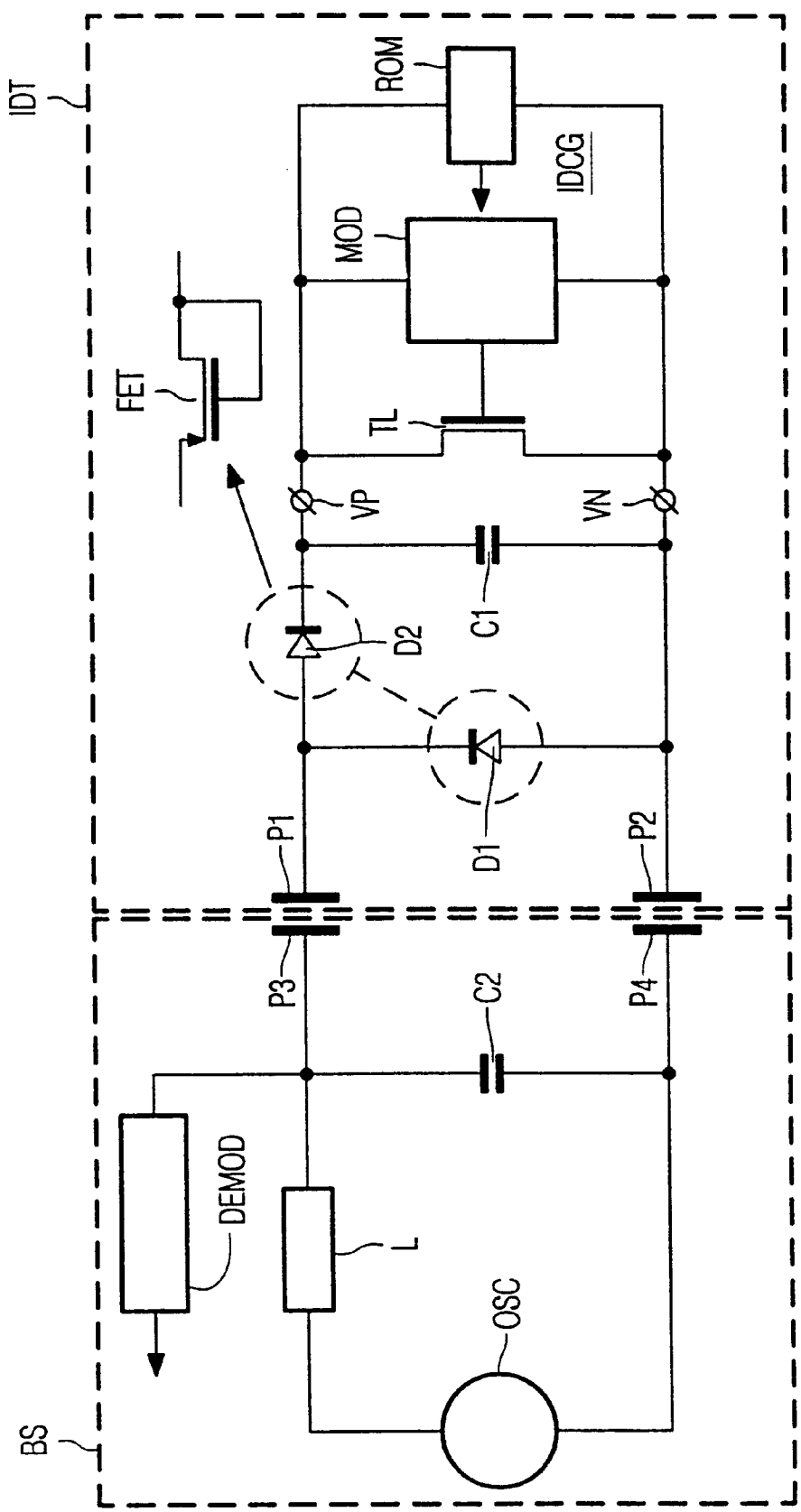
FIG. 2 is a circuit diagram of an embodiment of an identification transponder in accordance with the invention in which the transponder is capacitively coupled to a base station.

FIG. 2 shows an identification transponder IDT which can be capacitively coupled to a base station BS for reading out the identification code. The identification transponder IDT has two contact pads P1 and P2 which can be capacitively coupled to corresponding contact pads P3 and P4, respectively, of the base station BS. The capacitive coupling enables a contact-less coupling between the base station BS and the identification transponder IDT. The base station BS comprises an AC voltage generator which is connected to the contact pad P3 through an inductance L or through a resistance R (not shown). A capacitor C2 is connected between the contact pads P3 and P4. Also connected to contact pad P3 is a demodulator DEMOD. The identification transponder IDT comprises an identification code generator IDCG which corresponds to the identification code generator 10 in FIG. 1 and which can be made in the same way as described in relation to FIG. 1. The identification code generator IDCG comprises a read-only memory ROM and a modulator MOD both of which receive a DC working voltage from a positive supply terminal VP and a negative supply terminal VN. A smoothing capacitor C1 is connected between the positive supply terminal VP and the negative supply terminal VN. The contact pad P1 is connected to the positive supply terminal VP through a diode D2 which is poled to conduct current from the contact pad P1 to the positive supply terminal VP, whereas the contact pad P2 is directly connected to the negative supply terminal VN. A diode D1 is connected between the contact pad P1 and the contact pad P2 and conducts current from contact pad P2 to contact pad P1. The modulator MOD drives the gate of a load transistor TL which is connected between the positive supply terminal VP and the negative supply terminal VN. The diodes D1 and D2 are preferably made from diode-connected MISFETS as described hereinbefore, in a fashion denoted in FIG. 2 by FET.

The contact pads P1/P3 and the contact pads P2/P4 form capacitances and enable contact-less capacitive coupling of the base station BS and the identification transponder IDT. The oscillator OSC generates an AC voltage of, for example, 10 to 100 Volts with a frequency in the range of, for example, 10 to 50 kHz. During read-out of the identification transponder IDT the base station BS is coupled to the identification transponder IDT via the capacitances formed by the contact pads P1/P3 and P2/P4, typically 10 to 20 pF. This capacitance corresponds to an area of 1 $cm^2$, a distance of the contact pads of 100 micrometer and paper as a dielectric material between the contact pads. During read-out the AC voltage is rectified by the diodes D1 and D2 and converted to a DC working voltage at the positive and negative supply terminals VP and VN for supplying a working voltage to the identification code generator IDCG. Upon receiving the DC working voltage the modulator MOD drives the load transistor TL in and out conduction according to a bit pattern stored in the read-only memory ROM. The switching of the load transistor TL changes the load impedance at the contact pads P3 and P4 according to the same bit pattern and this change is detected by the demodulator DEMOD in the base station BS and reconverted to a data signal. The bit pattern in the read-only memory ROM may be programmed by means of a laser.

The implementation in organic materials and the capacitive coupling provide an identification transponder with mechanical flexibility and small thickness, suitable for incorporating in paper or textile. The identification transponder can be used as an electronic identification tag in bank notes, passports and the like, and in clothes, watches, jewerly and the like.

What is claimed is:

1. An identification transponder comprising an identification code generator embodied as an integrated circuit the integrated circuit predominantly comprising organic materials.

2. An identification transponder comprising: an identification code generator embodied as an integrated circuit predominantly comprising organic materials, wherein said integrated circuit is provided on an anti-theft sticker accommodating an LC resonant.

3. An identification transponder as claimed in claim 1, wherein, the identification code generator comprises, first and second contact pads for capacitively coupling the transponder to corresponding contact pads of a base station and for receiving an AC voltage from the base station, means for rectifying the AC voltage and for generating a DC working voltage for the identification code generator, the identification transponder including a load transistor driven by the identification code generator for loading the DC working voltage in response to an identification code generated by the identification code generator.

4. An identification transponder as claimed in claim 3, wherein the means for rectifying the AC voltage and for generating the DC working voltage comprises: a first diode connected between the first and second contact pads, a second diode connected between the first contact pad and a first supply terminal of the DC working voltage, and a capacitive element connected between the first supply terminal and a second supply terminal of the DC working voltage.

5. An identification transponder as claimed in claim 4, wherein the first and second diodes are diode-connected organic field-effect transistors (FET).

6. The identification transponder as claimed in claim 1 wherein the integrated circuit comprises a thin flexible element.

7. The identification transponder as claimed in claim 6 wherein the organic materials comprise polymeric materials.

8. The identification transponder as claimed in claim 6 wherein the integrated circuit is attached to a thin flexible substrate.

9. The identification transponder as claimed in claim 8 wherein the substrate comprises a sheet of paper or synthetic resinous material supporting a thin flat electronically conductive pattern arranged to form an inductor and a capacitor that together comprise an LC resonant circuit.

10. The identification transponder as claimed in claim 1 wherein the integrated circuit is attached to a thin flexible substrate so that the identification transponder as a whole forms a flexible device.

11. The identification transponder as claimed in claim 6 wherein the integrated circuit is attached to a thin flexible substrate so that the identification transponder as a whole forms a flexible device.

12. The identification transponder as claimed in claim 11 further comprising a thin flat electrically conductive pattern arranged on the substrate so as to form an inductor and a capacitor that together comprise an LC resonant circuit.

13. The identification transponder as claimed in claim 8 wherein the organic materials comprise electronically conductive polymeric materials.

14. The identification transponder as claimed in claim 1 wherein the integrated circuit is attached to a thin flexible substrate supporting a flat electrically conductive pattern arranged to form an inductor and a capacitor that together comprise an LC resonant circuit.

15. The identification transponder as claimed in claim 6 wherein the identification code generator comprises a rectifier circuit including at least one diode-connected field effect transistor made of an organic material.

16. The identification transponder as claimed in claim 1 wherein the identification code generator comprises first and second contact pads for capacitively coupling the transponder to corresponding contact pads of an external apparatus.

17. The identification transponder as claimed in claim 16 wherein the integrated circuit is attached to a flexible substrate which supports a rectifier circuit which, in response to an AC voltage supplied by the external apparatus via said contact pads, provides a DC operating voltage for the identification code generator.

18. The identification transponder as claimed in claim 17 further comprising a load transistor of organic material coupled to the rectifier circuit and switchable in response to a digital signal supplied to it from the identification code generator.

* * * * *